(12) United States Patent
Litterly et al.

(10) Patent No.: US 8,622,253 B1
(45) Date of Patent: Jan. 7, 2014

(54) ANHYDROUS AMMONIA FERTILIZER METERING AND DISTRIBUTION APPARATUS AND METHOD

(76) Inventors: Randall S. Litterly, Elkhart, IL (US); Douglas L. Litterly, Elkhart, IL (US)

( * ) Notice: Subject to any disclaimer, the term of this patent is extended or adjusted under 35 U.S.C. 154(b) by 41 days.

(21) Appl. No.: 13/481,471

(22) Filed: May 25, 2012

(51) Int. Cl.
- *G01F 11/00* (2006.01)
- *G01F 13/00* (2006.01)
- *F16K 5/10* (2006.01)
- *F16L 41/00* (2006.01)

(52) U.S. Cl.
USPC ......... 222/230; 222/360; 251/208; 137/561 A (58) Field of Classification Search
USPC ........... 222/71, 330, 360, 504, 485; 251/206, 251/208, 239; 137/561 A; 111/118, 119
See application file for complete search history.

(56) References Cited

U.S. PATENT DOCUMENTS

| | | | | |
|---|---|---|---|---|
| 234,447 A * | 11/1880 | Brown | ........................ | 222/360 |
| 349,527 A * | 9/1886 | Green | ........................ | 222/239 |
| 1,191,700 A * | 7/1916 | Howes | ........................ | 251/180 |
| 2,973,729 A * | 3/1961 | Peck | ........................ | 111/119 |
| 5,308,040 A * | 5/1994 | Torres | ........................ | 251/208 |
| 6,003,534 A * | 12/1999 | Gould et al. | ........................ | 137/1 |
| 6,416,032 B2 * | 7/2002 | Oh | ........................ | 251/14 |
| 8,100,067 B2 * | 1/2012 | Sidhwa et al. | ........................ | 111/118 |

* cited by examiner

*Primary Examiner* — Paul R Durand
*Assistant Examiner* — Benjamin R Shaw
(74) *Attorney, Agent, or Firm* — Robert L. Farris; Farris Law, P.C.

(57) ABSTRACT

Fluid fertilizer is supplied to a metering assembly by fluid vapor pressure. The assembly divides fluid flow into several equal flows that are injected into the ground. The metering assembly includes a body chamber with a bottom, a top and a cylindrical wall. A driven shaft, journaled in the top wall, extends into the chamber. A rotor is fixed to the drive shaft in the chamber. Pluralities of elongated slots pass through the rotor. Discharge bores pass through a body bottom wall. Each discharge bore includes a counter bore that receives a resilient O-ring and a graphite tube. A top end of the tube engages the rotor on both sides of the elongated slot. The compressed O-ring holds the tube top in engagement with the rotor.

18 Claims, 7 Drawing Sheets

ANHYDROUS AMMONIA FERTILIZER METERING AND DISTRIBUTION APPARATUS AND METHOD

TECHNICAL FIELD

The present invention relates to an apparatus and method for metering liquid anhydrous ammonia at a manifold which simultaneously divides the ammonia equally among multiple injection locations and controls total ammonia flow to applicator injectors. The apparatus allows a wider range of rates than a manifold with fixed orifices. The apparatus also improves flow rate adjustment accuracy between injection locations.

BACKGROUND OF THE INVENTION

Injection of anhydrous ammonia into the soil is a commonly used method of supplying nitrogen fertilizer to grain and other crops using an applicator vehicle pulled by a tractor. An ammonia storage tank is pulled behind the applicator. A hose connects the storage tank to the distribution system on the applicator. The distribution system splits the ammonia into separate lines which feed multiple knives. These knives are lowered into the soil several inches and ammonia is injected into the ground at the bottom of the knives as the knives are pulled through the soil.

It is normally desired that ammonia be applied uniformly over a field. One of the main problems in achieving this uniformity is difficulty in controlling a stream of mixed liquid and gaseous ammonia. Gaseous ammonia causes most flow sensors to supply incorrect data. Many anhydrous ammonia application systems use a heat exchanger to cool the ammonia flow from the storage tank to condense vapor which has been created by friction in the hose from a nurse tank.

Part of the liquid ammonia is used as a refrigerant to cool the inlet liquid stream. This is accomplished in a heat exchanger which mechanically separates the main stream of inlet liquid ammonia from a stream of coolant ammonia. Typically, the coolant stream is taken from the main stream after the heat exchanger. The coolant passes through a restriction and loses pressure and temperature before it enters coolant side of the heat exchanger. A portion of the coolant stream evaporates in the heat exchanger, taking heat from the main stream. This cools the main stream and condenses incoming ammonia vapor back to Liquid.

Most current anhydrous ammonia application systems follow the heat exchanger with a flow sensor which measures the rate of flow of incoming liquid ammonia. After the flow sensor this flow goes through a servo valve which regulates the total flow rate. At the servo valve the anhydrous experiences a pressure drop which causes some of it to vaporize. The resulting mixture of liquid and vapor phases is not easily split among the multiple injection locations.

Crops such as corn are planted by planters with a selected space between rows. The spacing between rows varies depending upon a number of factors including crop to be grown, soil conditions, and hours of sun shine during the crop growing period. The applicator usually has the number of soil cutting knives required to apply ammonia to the number of rows planted by a planter during each pass through a field. With automated tractor guidance system employed by some farmers, the number of soil cutting knives on an ammonia applicator may not be limited by the number of planter row units on the planter. A large applicator tool bar may require multiple metering manifolds.

SUMMARY OF THE INVENTION

The method and apparatus of the present invention encompasses a manifold which divides anhydrous ammonia flow among multiple injection locations. The invention has five advantages over other manifolds currently in use. First, it divides the liquid stream of anhydrous from the flow meter equally among the multiple injection locations. Second, the invention, which acts as a servo valve, allows control of the total flow of the ammonia. Third, the invention allows a much wider range of rates than a manifold with fixed orifices. Fourth, the invention's wide range makes possible variable rate application across a field. Fifth, the invention may include solenoid valves on lines to each row, making possible control of overlapping "point" rows in fields with odd shapes.

Design of a variable, multiple orifice manifold can be of several shapes. These shapes include, but are not limited to the following:

1-disk shape with the orifices located around the circumference of the disk. An inside rotor (disk) has orifices of a given configuration and an outside housing (stator) has orifices of a different given configuration. As the rotor turns inside the stator, the two different orifice configurations relate to vary the open area between the orifices.

2-disk shape with the orifices located in a circle around the face of the disk, concentric with the geometric center of the disk. An inside rotor (disk) has orifices of a given configuration and an outside housing (stator) has orifices of a different given configuration. As the rotor turns inside the stator, the two different orifice configurations relate to vary the open area between orifices.

3-linear shape with the orifices located along concentric bars or rounds. An inside part, has orifices of a given configuration in a straight line along that part. An outside housing has orifices of a different given configuration in a straight line, on the same spacing. As the two parts move linearly in relation to each other, the two different orifice configurations relate to vary the open area between the orifices.

Design-1 is not desirable because of the difficulty of machining orifices in curved surfaces. Design 2 is the preferred embodiment for this patent because precision rotary actuators are readily available for moving the orifices relative to each other. A limiting factor in design of the manifold is a requirement that the connections to the injection points be far enough apart so that appropriate fittings can be installed. Another factor mandating a minimum distance between is the need for one of orifices to travel a significant distance in order to vary the net difference in overall orifice opening. Too short of a distance can prevent the actuating device from making precise adjustments.

There is a multitude of geometries which can be defined for each set of orifices. The main requirement is that they can be machined in production. Another requirement is that the flow be proportional as the orifices move in relation to each other. Current manifold orifices generally have holes with diameters upward from 0.02 inches. The configuration and relation of orifices as an embodiment of this invention is:

1—one set of orifices consists of round holes 0.160 inch diameter;

2—the other set of orifices are slots transitioning from a hole of 0.03 inch diameter to a hole of 0.16 inch diameter;

3—the rotor orifice slot has center distance between holes of about ½ inch; and

4—travel between the two sets of orifices is such that one end of travel, there is no common opening between the orifices. At the other end of travel there is maximum area open for flow through the set of orifices.

Figure 1:
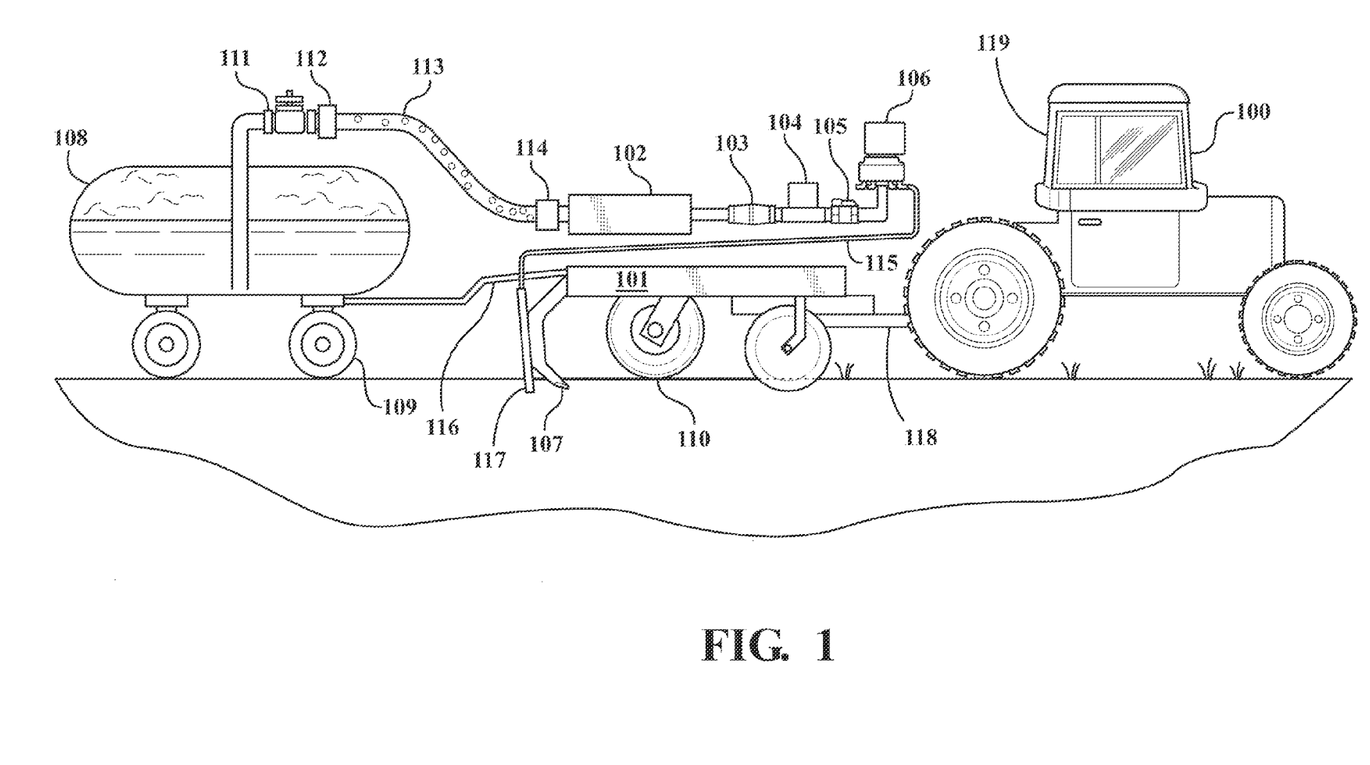
Figure 2:
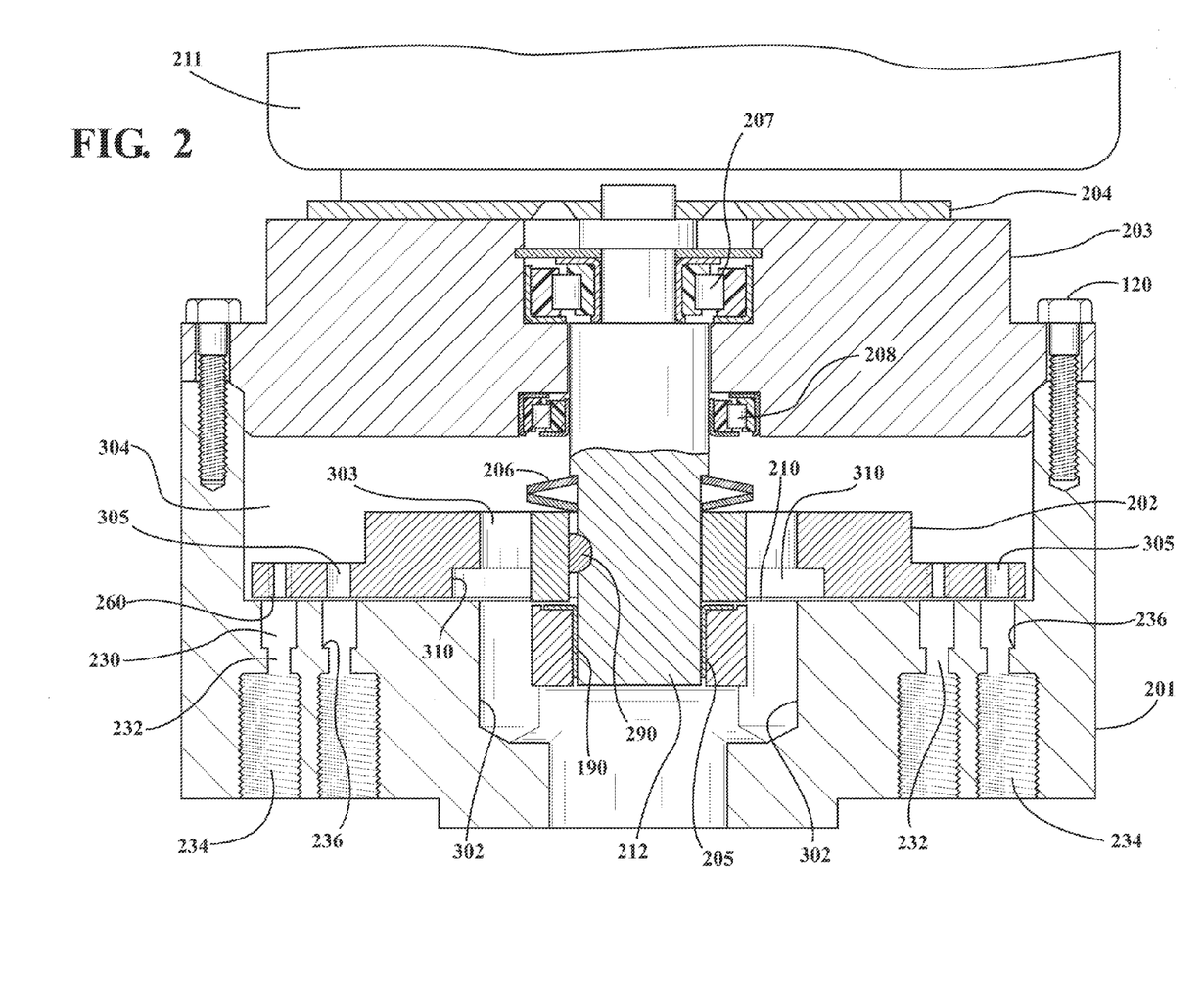

Since the variable orifices provide varying flow with a generally constant fluid pressure before the manifold, flow can be varied while maintaining the anhydrous ammonia as a liquid in the manifold. This is the prime requirement for maintaining equal flow among application rows.

Since there is a practical limit to the number of orifices that can be contained in a manifold, higher number of rows will utilize multiple synchronized manifolds.

The metering and distribution apparatus for anhydrous ammonia operates in a system with or without a mechanical pump. The flow of anhydrous ammonia through the apparatus is obtained by the vapor pressure of the anhydrous ammonia in a storage and supply tank. A heat exchanger may be employed to cool the anhydrous ammonia and prevent the formation of anhydrous ammonia vapors that could enter the metering and distribution apparatus.

The metering and distribution apparatus includes a body with an open top. The body includes a body cylindrical inside surface, a bottom wall and an anhydrous ammonia inlet in the bottom wall. A cover plate is clamped to the body to substantially close the open top and form a chamber. The chamber is defined by the cylindrical inside surface of the wall, the bottom wall and the cover plate.

A central bore through the cover plate has a bore axis that is coaxial with a body central axis and the body cylindrical inside surface. The bore axis is perpendicular to a chamber inside flat surface on the bottom wall.

A bearing counter bore is provided in an upper end of the central bore through the cover plate. A bearing is mounted in the bearing counter bore. A seal counter bore is provided in a lower end of the central bore through the cover plate. A seal is mounted in the seal counter bore. A drive shaft passes through the bearing and through the seal and into the chamber. The drive shaft has an axis of rotation that is coaxial with the body central axis. A motor mounted on cover plate outside of the chamber pivots the drive shaft to selected positions to control the flow rate of anhydrous ammonia.

A rotor is rotably fixed to the drive shaft and axially slidable on the drive shaft inside the chamber. The rotor has a radially outer surface that is spaced from the body cylindrical inside surface. A rotor bottom surface is parallel to and spaced from the chamber inside flat surface on the bottom wall. A plurality of inlet passages for anhydrous ammonia, pass through the rotor. The inlet passages are spaced from the shaft axis of rotation. The inlet passages through the rotor are in communication with a plurality of passages in the wall and the anhydrous ammonia inlet. The anhydrous ammonia inlet, the plurality of passages in the bottom wall and the plurality of inlet passages through the rotor cooperate to carry anhydrous ammonia into the chamber.

Each of a plurality of elongated orifices pass through the rotor from a rotor top surface to the rotor bottom surface. The elongated orifices are spaced from each other and radially, spaced inward from the rotor radially outer surface. Each of the plurality of elongated orifices includes a first cylindrical end arc with a first arc diameter and a second cylindrical end arc with a second arc diameter. The second arc diameter is smaller than the first arc diameter. A radially outer wall extends from the first cylindrical end arc to the second cylindrical end arc. A radially inner wall extends from the first cylindrical end arc to the second cylindrical end arc. An axis of the first cylindrical end arc and an axis of the second cylindrical end arc are positioned an equal distance from the shaft axis of rotation.

A plurality of discharge bores pass through the bottom wall of the body, are spaced apart from each other, and are spaced the same distance from the body central axis. Each of the plurality of discharge bores includes a discharge counter bore that is coaxial with the discharge bore. The discharge counter bore extends from the chamber to the discharge bore. A threaded counter bore is in communication with the discharge bore and extend out of the body. A resilient O-ring is mounted in the discharge counter bore adjacent to the discharge bore. A graphite tube is slidably received in the discharge counter bore. A graphite tube first end is in sealing engagement with a resilient O-ring. A graphite tube second end is in engagement with the rotor bottom surface. A tube bore passes through the graphite tube from the first end to the second end. The resilient O-ring urges the graphite tube toward the rotor. The rotor is axially urged toward the graphite tube parallel to the shaft axis of rotation to maintain engagement between the graphite tube second end and the rotor bottom surface. A spring is provided to urge the rotor toward the graphite tube second end. An outboard portion of the graphite tube second end is in engagement with the rotor bottom surface adjacent to the radially outer wall of the elongated orifice when the rotor positions the elongated orifice in fluid communication with the tube bore in all positions relative to the elongated orifice between the first cylindrical end arc and the second cylindrical end arc. An inboard portion of the graphite tube second end is in engagement with the rotor bottom surface adjacent to the radially inner wall of the elongated orifice in fluid communication with the tube bore in all positions relative to the elongated orifice between the first cylindrical end arc and the second cylindrical end arc.

Substantially all anhydrous ammonia fertilizer discharged from the chamber passes into the plurality of elongated orifices and through the tube bores through the plurality of graphite tubes that are active.

BRIEF DESCRIPTION OF DRAWINGS

The presently preferred embodiment of the invention is disclosed in the following description and in the following drawings, wherein:

FIG. 1 is a side elevation view of a tractor pulling a toolbar applicator employing an anhydrous ammonia fertilizer injection system with the metering manifold control system of this invention;

FIG. 2 is an enlarged vertical sectional view of the metering manifold with graphite tubes and O-rings removed;

FIG. 3 is a partial sectional view of the metering manifold with discharge fittings and with graphite tubes and O-rings removed and parts broken away;

FIG. 4 is a schematic view showing a range of relationships between shaped orifices passages through a rotor and fixed orifices in a stator or body;

FIG. 5 is a schematic view similar to FIG. 4 with an alternate shape of the orifice passages through the rotor;

FIG. 6 is a sectional view, taken along line 6-6 in FIG. 3, of shaped orifice passages through a rotor and fixed orifices, in a maximum flow positions relative to each other, that accommodate multiple knives.

FIG. 7 is FIG. 2 with graphite tubes and O-rings added; and

FIG. 8 is FIG. 3 with graphite tubes and O-rings added.

DETAILED DESCRIPTION OF THE PREFERRED EMBODIMENTS

FIGS. 1-8 depict embodiments of the apparatus of the present invention.

The relation of the present invention to other components of an anhydrous ammonia applicator is shown in FIG. 1. The apparatus of the present invention is shown being pulled behind a tow vehicle 100 which could be a tractor, truck, or the like. The apparatus includes a toolbar applicator frame 101 which supports a heat exchanger 102, a total flow measurement system 103, an electrically operated shut off valve 105, a flow rate control valve 104, a distribution and metering manifold 106, a plurality of connecting tubes 115 each of which is connected to one of a plurality of soil cutting knives 107. Multiple knives 107 are suspended from the toolbar applicator frame 101, with there being eight or more of the knives 107 attached to a toolbar applicator frame, which is adapted to raise or lower the knives 107 into the soil. Each knife 107 includes at least one injector nozzle 117 through which the ammonia can be emitted into the soil when the knife 107 is lowered into the soil. A storage tank 108, for anhydrous ammonia or other liquid fertilizer is supported on a plurality of wheels 109 and towed behind the toolbar applicator frame 101. The toolbar applicator frame 101 itself is supported on a plurality of wheels 110 and has a tongue 118 that is pivotally connected to a hitch on the rear of the tow vehicle 100. The storage tank 108 is a pressurized tank that is commercially available and retains a predetermined quantity of fertilizer which may be, by way of illustration, anhydrous ammonia. The storage tank 108 is on a trailer that also has a tongue 116 that is pivotally connected to a hitch on the toolbar applicator frame 101. Liquid pressurized by gas in the storage tank flows from the tank to a tank shut off valve 111 and to an acme quick connector with a globe shut off valve 112. Liquid then flows through a hose 113 to a breakaway coupling 114 and to the heat exchanger 102. The flow sensor 103 is connected to a console/controller in the operator's cab 119 of the tow vehicle 100 so that the operator of the tow vehicle can monitor and control the flow of ammonia through a distribution and metering manifold 106. The console/controller regulates the manifold 106. At the manifold 106 the liquid ammonia is metered among the lines 115 to the multiple injection knives 107. In the preferred embodiment, the toolbar applicator frame is a Progressive series 1300 NH3® Toolbar, manufactured by Progressive Farm, Products, Inc. of Hudson, Ill. It is configured by Progressive for "strip till" ammonia application FIG. 2 displays the mechanical components of the distribution and metering manifold 106 in a sectional view. The rotor 202 is slidably attached to the drive shaft 212 and rotates inside the body 201 of the manifold 106. A key 290 prevents rotation of the rotor relative to the drive shaft 212. A gear motor 211 drives the shaft 212 within a selected fixed range of a few degrees to as much as 45 degrees. The gear motor 211 is attached to the cover plate 203 by means of an interface plate 204. The drive shaft 212 is journaled by a sealed ball or roller bearing 207. The drive shaft 212 may also be journaled in a bushing 190 in the bore 205 in the body 201. A lip seal 208 prevents passage of anhydrous ammonia to the sealed roller or ball bearing 207 and atmosphere. The lip seal 208 is constructed from a material compatible with anhydrous ammonia such as Teflon® or UHMW polyethylene. The cover plate 203 is sealed to the body 201 by flexible sealant or an appropriately placed O-ring. Bolts 120 clamp the cover plate 203 to the body 201. A Belleville washer spring 206 on the drive shaft 212 urges the rotor 202 toward the bore base 210 of the chamber 304.

Figure 3:
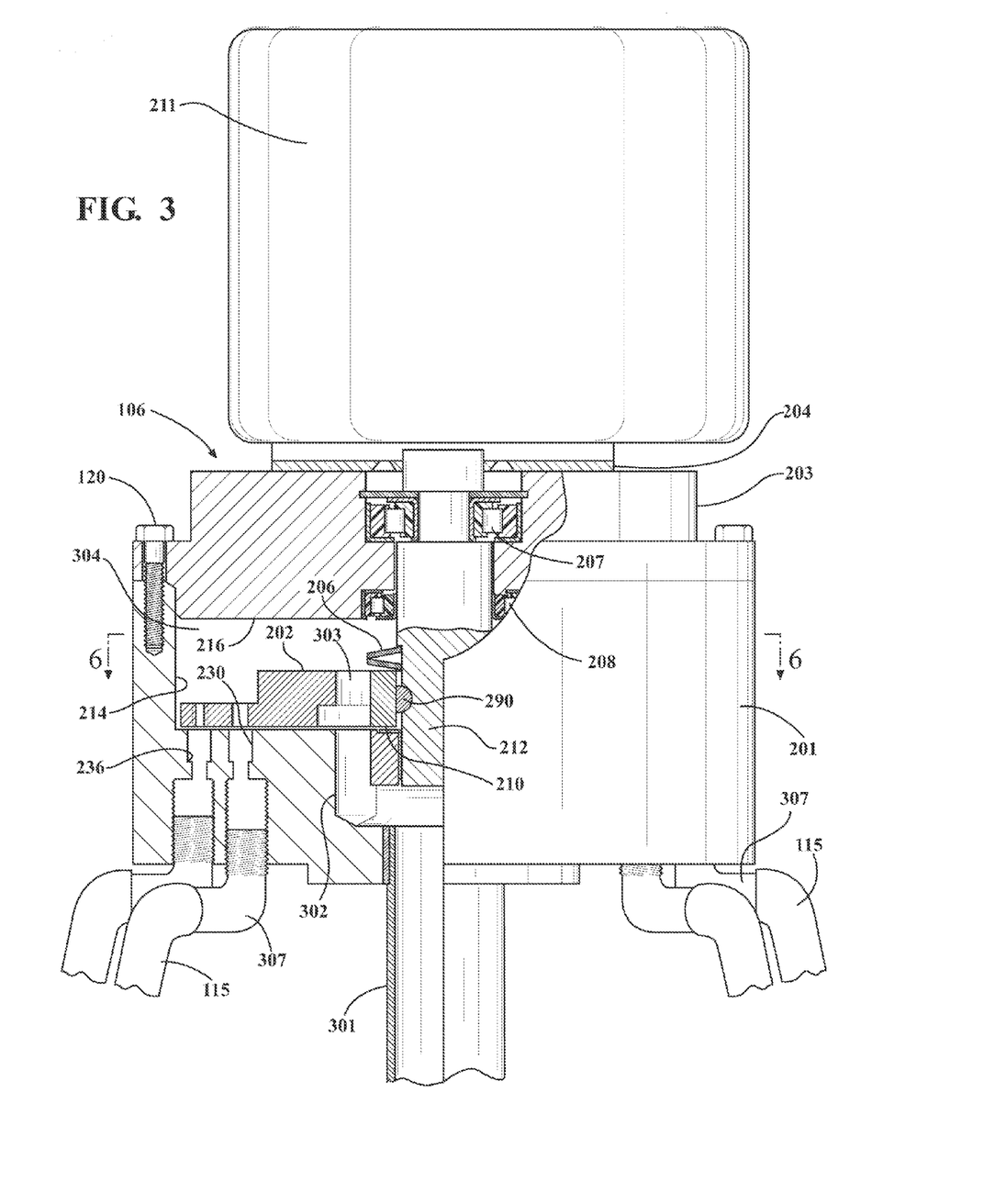

FIG. 3 is a partial cross section view of the distribution and metering manifold 106. Anhydrous ammonia enters the manifold 106 through pipe 301. Flow splits in the body 201 into several passages 302. Flow continues through the rotor 202 through a plurality of passages 303 and into a chamber 304. The chamber 304 is defined by the bore base 210, the cylindrical wall surface 214, and the bottom surface 216 of the cover plate 203. The chamber 304 inside the manifold body 201 allows flow to orifices 305 in the rotor 202. The chamber 304 is filled with anhydrous ammonia. The space between a flat bottom surface 260 of the rotor 202 and the floor of the chamber 304 in the body 201 also holds some anhydrous ammonia. Orifices 305 in the rotor 202 communicate with tube bores 246 in the graphite cylinders 240. As the rotor 202 is rotated inside the body 201, open area between the orifices 305 and the tube bores 246 varies from totally open to totally closed. Flow from individual orifice 305 and tube bore 246 pairs pass through fittings 307 and tubes 115 to individual knives or openers 107. The fittings 307 may include nipples, elbows, a combination of nipples and elbows or other suitable tubing members. Optionally, at the fitting 307 to each knife 107, an electrically operated solenoid valve can be installed which turns on and off flow to that knife, independent of the other knives. Master rate controllers such as Insight made by Ag leader Technology of Ames, Iowa and Greenstar, made by Deere & Company of Moline, Ill. have the capability of shutting off flow to individual lines 115. These controllers provide the mechanical means to turn off flow to individual knives 107.

Figure 4:
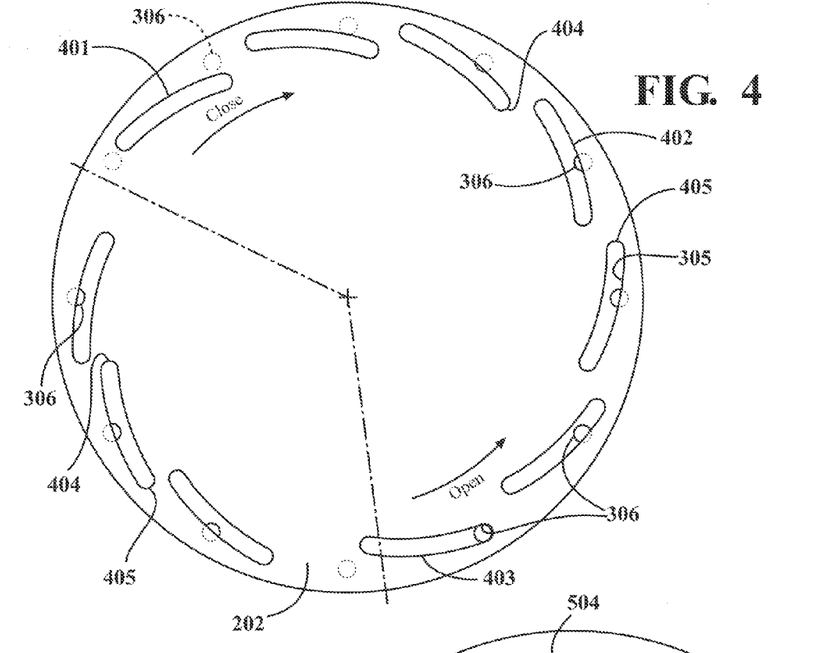

In the embodiment shown schematically in FIG. 4, the fully closed position 401 is shown at the 10 o'clock position. The fully open position 403 is shown at the 5 o'clock position while partially open positions are shown in the other locations, typified by position 402. One end 405 of the slot 305 is located on the circle which is the locus of centers of the fixed orifices 306. These orifices 306 correspond to the tube bores 246 in graphite tubes 240 shown in FIGS. 7 and 8. The center of the arc is such that when the rotor 202 is in fully open position 403 for maximum flow, the end 405 of the arc is directly over the fixed orifice 306. The center of the arc is such that when the rotor 202 is positioned in closed position 401 to shut off flow, the end 404 of the arc is completely offset from the fixed orifice 306.

Figure 5:
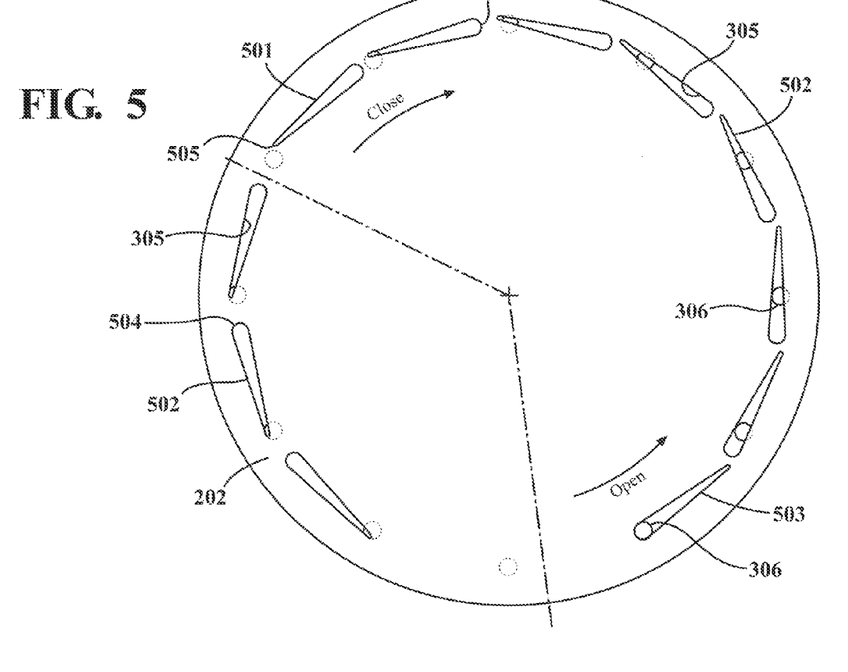

In the embodiment shown in FIG. 5, the fully closed position 501 is shown at the 10 o'clock position. The fully open position 503 is shown at the 5 o'clock position while partially open positions are shown in the other locations, typified by partially open position 502. The slots shown in FIG. 5 are tapered between two holes of different diameters. The slot end 504 has a 0.160 inch diameter. This end 504 of the slot is located on the circle which is the locus of centers of the fixed orifices 306. The end 504 of the slot is such that when the rotor is in position 503 for maximum flow, the end 504 of the slot is directly over the fixed orifice 306. The slot end 505 has a 0.0325 inch diameter. The end 505 of the slot is such that it is offset on a circle outside the circle of the locus of the centers of fixed orifices 306. However, the arc at the end 505 of the slot is completely contained inside the circle of fixed orifices 306 when directly over the fixed orifice as shown at the 9 o'clock position. For both FIG. 4 and FIG. 5 the rotor 202 moves in relation to the fixed orifices 306 so that at one end of travel there is no overlapping of the fixed orifices and the rotating slot 305. At the other end of rotation, the orifices overlap so that there are maximum open areas through both the slot 305 in the rotor 202 and the orifices 306 in the body 201.

A minor flow of anhydrous ammonia between the rotor 202 bottom surface 260 and the bore base 210 in the body 201 is desirable. The flow of anhydrous ammonia through the entire chamber 304 will maintain a substantially uniform ammonia temperature. An unintended increase in temperature or decrease in pressure in the chamber 304 could result in some anhydrous ammonia changing from a liquid to a gas. The rotor flat bottom surface 260 of the rotor 202 is parallel to the bore base 210 of the body 201 of the manifold 106. The rotor flat bottom surface 260 is also perpendicular to the axis of rotation 606 of drive shaft 212. During operation, all of the orifices 305 in the rotor 202 are in the same position relative to an adjacent orifice 306 in the body 201 so that the flow through one tube bore 246 is the same as the flow through all the other tube bores.

Figure 7:
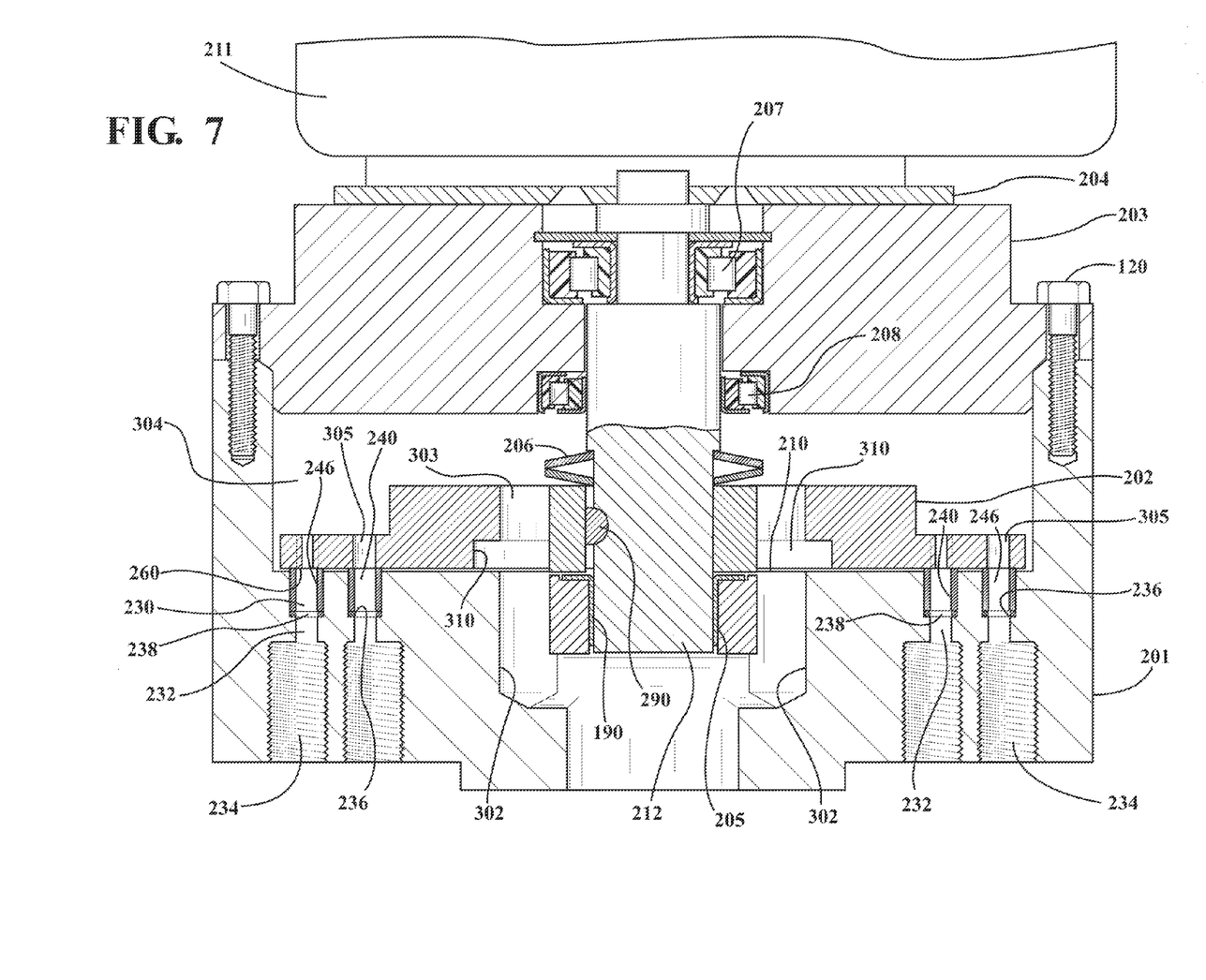
Figure 8:
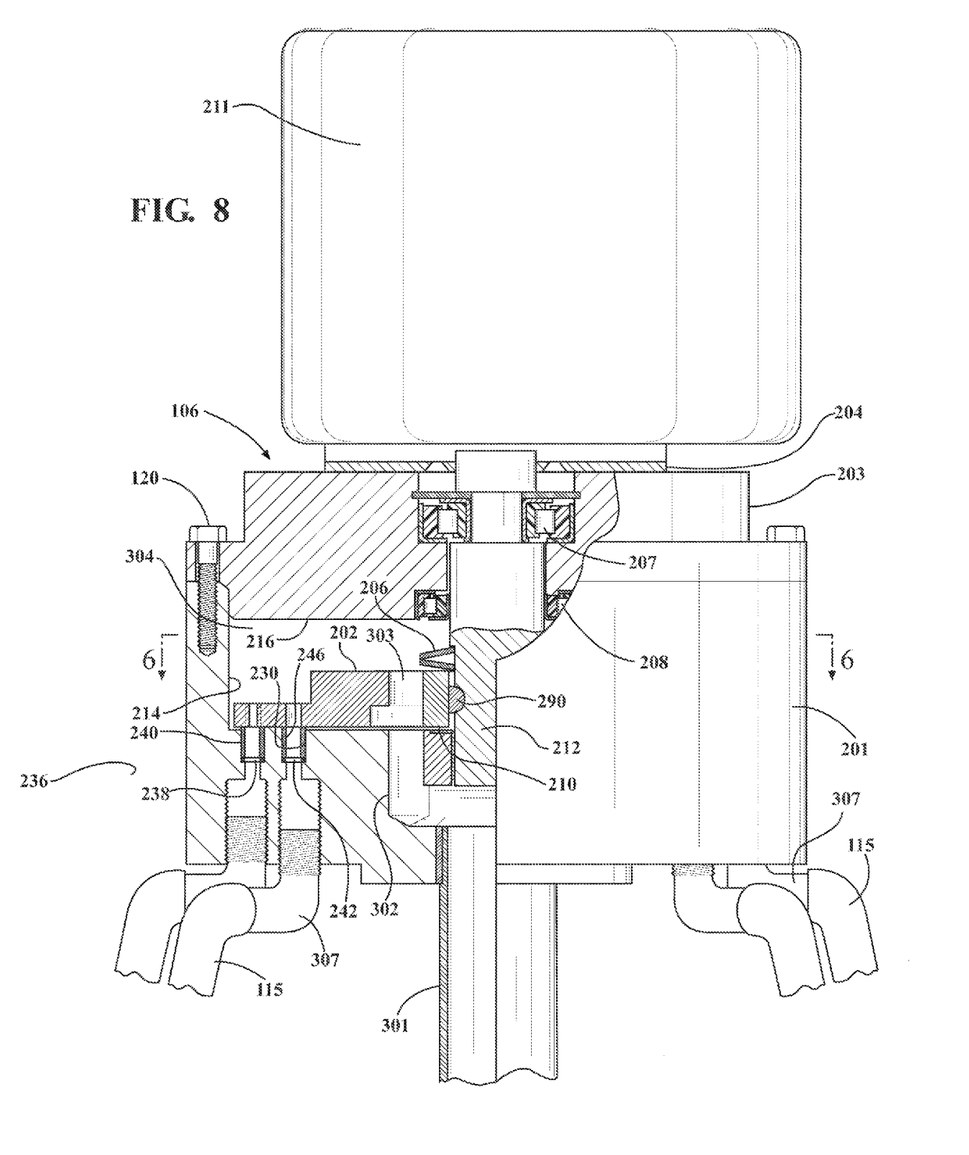

The control of the flow path of anhydrous ammonia from chamber 304 and into each tubular line 115 is shown in FIGS. 7 and 8. This flow control includes a counter bore 230 in the body 201 shown in FIG. 2. A discharge bore 232 extends from the counter bore 230 to a threaded counter bore 234. A fitting 307 is mounted in each threaded counter bore 234. A tubular line 115 is secured to the fitting 307. A resilient O-ring 238 is inserted into the bottom 236 of the counter bore 230. A graphite tube 240 is positioned in the counter bore 230. The graphite tube 240 has an outer cylindrical surface that engages the walls of the counter bore 230. The graphite tube 240 is sized to be received in the counter bore 230 without force and to minimize radial movement. A first end 242 of the tube 240 contacts the O-ring 238. The second end 244 of the tube 240 engages the rotor 202. The rotor 202 exerts some force on the tube 240 to compress the O-ring 238. The O-ring 238 maintains a seal between the first end 242 of the tube 240 and the bottom 236 of the counter bore 230.

The tube 240 is preferably made from graphite. Graphite may be formed by extrusion, or molding. Tube 240 may also be formed by machining a graphite block. The graphite members preferably have high density and strength. A fine surface finish and precision tolerances are obtainable by employing suitable grades of graphite. The end products are resistant to oxidation, have low levels of thermal expansion and are suitable for chemical process equipment. Graphite is also a suitable bearing material. A tube bore 246 through the tube 240 has a diameter of 0.160 inches for a maximum flow rate. An increased application rate may be obtained by decreasing the speed of the tow vehicle 100. However a higher application rate may damage a crop. The size of the tube bore 246 may also be increased if needed. The size of other passages would need to be increased to correspond with the increased diameter of the tube bore 246. Pressure drops in the system are avoided to prevent the formation of gas.

FIG. 6 shows a rotor 602 with elongated orifices 605. Each of the elongated orifices 605 has a cylindrical end arc 604 with a diameter of 0.160 inches. Each of the orifices 605 also has a cylindrical end arc 603 with a diameter of 0.0325 inches. The end arcs 604 and 603 of the orifices 605 have arc axes that are the same distance from an axis of rotation 606 of the rotor 602 and the drive shaft 212. A cylindrical wall 608 of the rotor 602 is also coaxial with the axis of rotation 606. The cylindrical wall 608 is spaced from a cylindrical inside wall 222 of the body 201 to permit the flow of anhydrous ammonia. The radially inner wall 610 and the radially outer wall 612 of each orifice 605 are arcs extending from an end arc 603 to an end arc 604. One end of the radially outer wall 612 joins the radially outer portion of the end arc 604. The other end of the radially outer wall 612 joins a radially outer portion of the end arc 603. One end of the radially inner wall 610 joins the radially inner portion of the end arc 604. The other end of the radially inner wall 610 joins a radially inner portion of the end arc 603. The distance between radially outer wall 612 and the radially inner wall 610 decreases from end arc 604 to end arc 603 of each orifice 605.

The distance between the radially outer wall 612 and a circle about the axis of rotation 606 of the rotor 602 and passing through the axes of end arcs 603 and 604, along a radius of the rotor, is equal to the distance between the radially inner wall 610 and the circle about the axis of rotation of the rotor along the same radius of the rotor. An axis of the tube bore 246 of each graphite cylinder 240 is midway between the radially outer wall 212 and the radially inner wall 610 when the tube bore 246 is in alignment with an elongated orifice 605. This structure insures that the second end 244 of the graphite tube 240 engages the rotor 602 in each counter bore 230, in at least two areas one hundred and eighty degrees (180°) apart in any position between the end arc 603 and the end arc 604 of each elongated orifice 605. This structure of the elongated orifice 605 eliminates bending loads on the graphite tube 240. Bending loads due to movement between the rotor 602 and the graphite tubes 240 are small. The elimination of bending loads insures that the O-ring 238 is able to maintain adequate pressure between graphite tube 240 second end 244 and the rotor 602 during all settings of flow rate.

Movement of the second end 244 of each graphite tube 240 along the radially inner wall 610 and along the radially outer wall 612 of each elongated orifice 605, during anhydrous ammonia flow rate adjustment, is facilitated by continuous engagement with rotor 602 on both sides of the elongated rotor orifices. The lubrication characteristics of graphite reduce friction forces between the rotor and 602 and the graphite tube 240.

The elongated orifice 605 in the rotor 602 provides maximum flow rate of anhydrous ammonia when the orifice end 604, with a diameter of 0.160 inches, is in axial alignment with the second end 244 of the tube bore 246 through the graphite tube 240. The diameter of the cylindrical end 604 of the elongated orifice 605 through the rotor 602, the diameter of the tube bore 246 through the graphite tube 240 and the diameter of the discharge bore 232 through the body 201 are all the same. If a larger maximum flow is desired at times, it would be desirable to increase all three diameters. If a smaller maximum flow rate is desired it would be desirable to decrease the diameter of the tube bore 246 through the tube 240 the diameter of the discharge bore 232, and the diameter of the orifice end 604 of the elongated orifice 605. Changes in the diameter of flow passages relative to each other inside the metering manifold 106 may result in pressure drops and allow some ammonia to become a gas. Anhydrous ammonia should remain a liquid at least until it enters the lines 115 that carry ammonia to the soil cutting knives 107.

The flow rate is reduced, from a maximum flow rate, by rotating the rotor 202 to a position in which the elongated orifice 605 decreases the size of the opening into the second end 244 of the tube 240. The gear motor 211 is energized to rotate the rotor 202 or 602. The rate of change in the flow rate is substantially constant along the length of the inner wall 610 and the outer wall 612, when the inner and outer walls are controlling the size of the entrance into the tubular bore 246. The elongated orifice 605 remains full of anhydrous ammonia during operation to assists in insuring that only liquid passes through the tube bore 246 in the tube 240.

There are thirteen elongated orifices 605 through the rotor 602 that cooperate with the thirteen body orifices or tube bores 246 through the graphite tubes 240 in the body 201 to meter anhydrous ammonia into the ground. These thirteen passages provide anhydrous ammonia for twelve rows of plants such as American corn. If the planter makes two parallel side by side passes through the field, one of the two outside lines 115 to a soil cutting knife 107 is closed by a valve that is not shown. The elongated orifices 605 extend at least twenty degrees (20°) from end 603 to the end 604 about the axis of rotation 606. This angle provides elongated orifices 605 with sufficient length to accurately dispense anhydrous ammonia and to completely shut off flow through the metering manifold 106 with ninety seven percent (97%) accuracy or better. The accuracy is important because too little as well as too much anhydrous ammonia can decrease crop yield. The gear motor 211 and the metering manifold 106 can change the application rate, while moving across a field, based on soil samples and the quantity of nitrogen stored in the soil.

Figure 6:
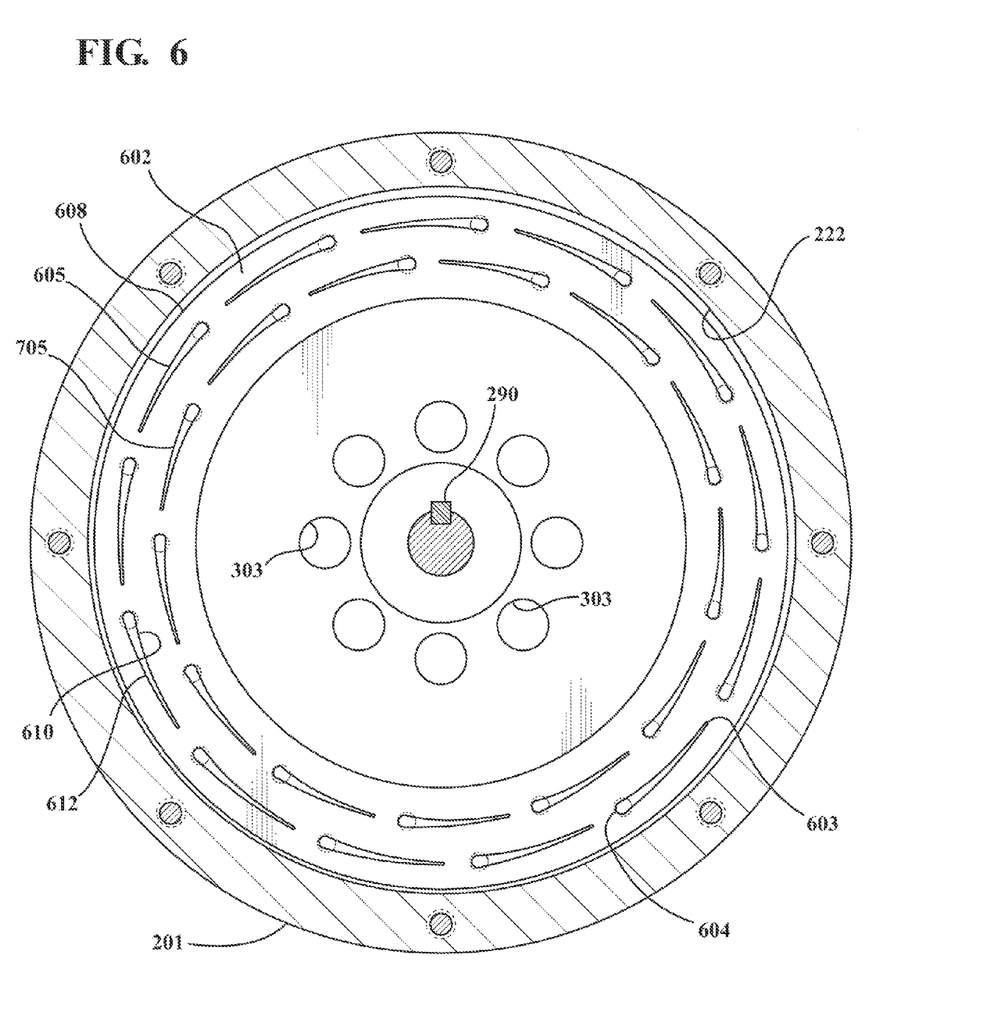

The elongated orifices 605 shown in FIG. 6 extend an angle 650 of twenty three degrees (23°) from each end arc 603 to the other end arc 604 of each orifice. The longer the length of each orifice 605 the more accurate the application rate. There is a limit to the number of elongated orifices that can be provided at an equal radius from the center of a rotor 602. The diameter of a rotor 602 could be increased to increase the length of each elongated orifice 605. An increase in diameter increases the volume of the chamber 304 and my lead to the formation of gas.

The elongated orifices 605 shown in FIG. 6 in combination with the tube bore 246 through the graphite tube all provide substantially the same flow rate of anhydrous ammonia. All of the flow rates are adjusted together simultaneously by energizing the gear motor 211 to pivot the rotor 202. For larger tool bars more than one distribution and metering manifold may be employed.

Radially inner elongated orifices 705, shown in FIG. 6 can be added if desired. However, the 23° arc is shorter. The shorter total length of each elongated orifice 705, with the same diameter ends 603 and 604 as the radially outer elongated orifices 605, requires some modification to permit the same passage flow rate of liquid anhydrous ammonia as the radially outer elongated orifice.

The orifice cylinder tubes 240 could be made from a material other than graphite. Nylon® tubes have been tried. Nylon is generally a good bearing material. However it has been found that some liquids such as water and anhydrous ammonia is either absorbed or sticks to the Nylon®. The result is a smaller effective diameter of the tube bore 246. The changes in the effective diameter of the tube bore 246 changes the flow rate of anhydrous ammonia through the tubes 240. The change in effective diameter of the tube bores 246 through Nylon® tubes appears to vary from one tube to another. The graphite tubes 240 provide a substantially uniform flow rate when pressure and temperature in the chamber 304 are unchanged.

The orifice cylinder tubes 240, when used with the slot 305 shown in FIG. 4 and FIG. 5, do not have equal surface area on the second end 244 engaging the flat bottom surface 260 of a rotor 202 on both sides of the slot 305. In some positions the second end 244 may be out of engagement with the flat bottom surface 260 on one side of the slot 305. As a result, forces are exerted unevenly across the second end 244 of an orifice tube 240. This uneven force on the second end 244 of each orifice cylinder tube 240 results in variations in flow rates through the tube bores 246 when the rotor 202 is in one selected position. The slots 705 shown in FIG. 6 provides substantially equal fluid flow rates through all of the tube bores 246 when the rotor 602 is any one of the selected positions.

The second end 244 of the tubes 240 wears during use. Due to the wear and other factors, it may be difficult to maintain a desired compression load on the resilient O-ring 238 and maintain a seal. To control the force exerted on the O-ring 238, the rotor 202 or 602 is permitted so slide on the drive shaft 212 parallel to the axis 606 of rotation of the rotor. A key 290 prevents rotation between the drive shaft 212 and the rotor 202 or 602. A spring 206 urges the rotor 202 or 602 toward the second ends 244 of the tubes 240 and controls the load on the resilient O-rings 238. The spring 206 is two Belleville washers as shown in FIGS. 7 and 8. The spring 206 could also be a coil spring.

We claim:

1. An anhydrous ammonia fertilizer metering and distribution apparatus comprising:

a body with an open top, a wall with a body cylindrical inside surface, a bottom wall, and an anhydrous ammonia inlet in the bottom wall;

a cover plate clamped to the body, substantially closing the open top and forming a chamber defined by the cylindrical inside surface of the wall, the bottom wall and the cover plate;

a central bore through the cover plate having a bore axis that is coaxial with a body central axis and the body cylindrical inside surface and perpendicular to a chamber inside flat surface on the bottom wall;

a bearing counter bore in an upper end of the central bore through the cover plate, a bearing mounted in the bearing counter bore, a seal counter bore in a lower end of the central bore through the cover plate, and a seal mounted in the seal counter bore;

a drive shaft passing through the bearing and through the seal and into said chamber having a shaft axis of rotation coaxial with the body central axis and driven by a motor mounted on the cover plate outside of said chamber;

a rotor rotatably fixed to the drive shaft, slidable on the driveshaft along the body central axis and at least one spring urging the rotor toward the bottom wall inside said chamber having a rotor radially outer surface that is spaced from the body cylindrical inside surface, a rotor bottom surface that is parallel to and spaced from the chamber inside flat surface on the bottom wall, and a plurality of inlet passages through the rotor spaced from the shaft axis of rotation, and in communication with a plurality of passages in the bottom wall and the anhydrous ammonia inlet, and wherein the anhydrous ammonia inlet, the plurality of passages in the bottom wall and the plurality of inlet passages through the rotor cooperate to carry anhydrous ammonia into said chamber;

a plurality of elongated orifices passing through the rotor from a rotor top surface to the rotor bottom surface, spaced from each other and radially spaced inward from the rotor radially outer surface;

each of the plurality of elongated orifices including a first cylindrical end arc with a first arc diameter, a second cylindrical end arc with a second arc diameter that is smaller than the first arc diameter, a radially outer wall extending from the first cylindrical end arc to the second cylindrical end arc, a radially inner wall extending from the first cylindrical end arc to the second cylindrical end arc, and wherein an axis of the first cylindrical end arc and an axis of the second cylindrical end arc are positioned an equal distance from the shaft axis of rotation;

a plurality of discharge bores passing through the bottom wall of the body, spaced apart from each other and radially spaced the same distance from the body central axis;

each of the plurality of discharge bores including a discharge counter bore coaxial with the discharge bore and extending from said chamber to the discharge bore, a threaded counter bore in communication with the discharge bore and extending out of the body, a resilient O-ring mounted in the discharge counter bore adjacent to the discharge bore, a graphite tube slidably received in the discharge counter bore with a graphite tube first end in sealing engagement with the resilient O-ring, a graphite tube second end in engagement with the rotor bottom surface, a tube bore through the graphite tube, wherein the resilient O-ring urges the graphite tube toward the rotor and maintains engagement between the graphite tube second end and the rotor bottom surface with an outboard portion of the graphite tube second end in engagement with the rotor bottom surface adjacent to the radially outer wall of the elongated orifice when the rotor positions the elongated orifice in fluid communication with the tube bore in all positions relative to the elongated orifice between the first cylindrical end arc and the second cylindrical end arc, and an inboard portion of the graphite tube second end in engagement with the rotor bottom surface adjacent to the radially inner wall of the elongated orifice when the rotor positions the elongated orifice in fluid communication with the tube bore in all positions relative to the elongated orifice between the first cylindrical end arc and the second cylindrical end arc; and wherein substantially all anhydrous ammonia fertilizer discharged from said chamber passes into the plurality of elongated orifices and through the tube bores through the plurality of graphite tubes that are active.

2. An anhydrous ammonia fertilizer metering and distribution apparatus, set forth in claim 1, wherein the radially outer wall of the converges toward the radially inner wall from the first cylindrical end arc to the second cylindrical end arc of each of the plurality of elongated orifices passing through the rotor.

3. An anhydrous ammonia fertilizer metering and distribution apparatus, set forth in claim 2, wherein the radially outer wall and the radially inner wall, of each of the plurality of elongated orifices, are arcuate.

4. An anhydrous ammonia fertilizer metering and distribution apparatus, set forth in claim 3, wherein the distance from a circle about the shaft axis passing through a first arc axis parallel to shaft axis and passing through a second arc axis parallel to the shaft axis, to the radially outer wall along a selected radius from the body central axis, is equal to the distance from the circle to the radially inner wall along the selected radius for each of the plurality of elongated orifices.

5. An anhydrous ammonia fertilizer metering and distribution apparatus, set forth in claim 1, wherein the anhydrous ammonia inlet in the bottom wall is coaxial with the body central axis.

6. An anhydrous ammonia fertilizer metering and distribution apparatus, set forth in claim 1, wherein the drive shaft extends into a drive shaft bore in the bottom of the body.

7. An anhydrous ammonia fertilizer metering and distribution apparatus, set forth in claim 1, wherein the tube bores through each of the graphite tubes discharge substantially the same quantity of anhydrous ammonia when the rotor and drive shaft are held in one of an infinite number of positions relative to the body.

8. An anhydrous ammonia fertilizer metering and distribution apparatus, set forth in claim 1, including a second plurality of elongated orifices passing through the rotor that cooperate with a second plurality of discharge bores passing through the bottom wall of the body, and wherein the second plurality of elongated orifices and the second plurality of discharge bores are positioned radially inward toward the drive shaft and the shaft axis of rotation from said plurality of elongated orifices and said plurality of discharge bores.

9. An anhydrous ammonia fertilizer metering and distribution apparatus, set forth in claim 1, wherein each of the plurality of elongated orifices extends an angle of at least twenty degrees about the shaft axis from a first elongated orifice end to a second elongated orifice end.

10. An anhydrous ammonia fertilizer metering and distribution apparatus, set forth in claim 1, wherein the at least one spring urging the rotor toward the bottom wall is a Belleville washer.

11. Anhydrous ammonia fertilizer metering and distribution apparatus, set forth in claim 1, wherein the at least one spring urging the rotor toward the bottom wall is at least two Belleville washers.

12. An anhydrous ammonia fertilizer metering and distribution apparatus comprising:
a body with a chamber defined by a chamber cylindrical inside suffice on a body wall and encircling said chamber, a chamber flat bottom surface on a body bottom wall, and a chamber top surface on a body top wall;
a central bore through the body top wall having a bore axis that is coaxial with the chamber cylindrical inside surface and perpendicular to the chamber flat bottom surface on the body bottom wall;
a bearing counter bore in an upper end of the central bore through the body top wall, a bearing mounted in the bearing counter bore, a seal counter bore in a lower end of the center bore, and a seal mounted in the seal counter bore;
a drive shaft passing through the bearing and through the seal and into said chamber, having a shaft axis of rotation coaxial with the bore axis and driven by a motor mounted on the body top wall outside of said chamber;
a rotor rotatably fixed to the drive shaft slidable on the drive shaft along the shaft axis of rotation and at least one spring urging the rotor toward the chamber flat bottom surface inside said chamber having a rotor radially outer surface that is spaced from the chamber cylindrical inside surface, a rotor bottom surface that is parallel to and spaced from the chamber flat bottom surface on the body bottom wall, and a plurality of inlet passages through the rotor spaced from the shaft axis of rotation, and in communication with a plurality of passages in the body bottom wall and an anhydrous ammonia inlet in the body bottom wall, and wherein the anhydrous ammonia inlet, the plurality of passages in the body bottom wall and the plurality of inlet passages through the rotor cooperate to carry anhydrous ammonia into said chamber;
a plurality of elongated orifices passing through the rotor from a rotor top surface to the rotor bottom surface, spaced from each other and radially spaced inward from the rotor radially outer surface;
each of the plurality of elongated orifices including a first cylindrical end arc with a first arc diameter, a second cylindrical end arc with a second arc diameter that is smaller than the first arc diameter, a radially outer wall extending from the first cylindrical end arc to the second cylindrical end arc, a radially inner wall extending from the first cylindrical end arc to the second cylindrical end arc, and wherein an axis of the first cylindrical end arc and an axis of the second cylindrical end arc are positioned an equal distance from the shaft axis of rotation;
a plurality of discharge bores passing through the body bottom wall of the body, spaced apart from each other and radially spaced the same distance from the body central axis;
each of the plurality of discharge bores including a discharge counter bore coaxial with the discharge bore and extending from said chamber to the discharge bore, a threaded counter bore in communication with the discharge bore and extending out of the body, a resilient O-ring mounted in the discharge counter bore adjacent to the discharge bore, a graphite tube slidably received in the discharge counter bore with a graphite tube first end in sealing engagement with the resilient O-ring, a graphite tube second end in engagement with the rotor bottom surface, a tube bore through the graphite tube, wherein the resilient O-ring urges the graphite tube toward the rotor and maintains engagement between the graphite tube second end and the rotor bottom surface with an outboard portion of the graphite tube second end in engagement with the rotor bottom surface adjacent to the radially outer wall of the elongated orifice when the rotor positions the elongated orifice in fluid communication with the tube bore in all positions relative to the elongated orifice between the first cylindrical end arc and the second cylindrical end arc, and an inboard portion of the graphite tube second end in engagement with the rotor bottom surface adjacent to the radially inner wall of the elongated orifice when the rotor positions the elongated orifice in fluid communication with the tube bore in all positions relative to the elongated orifice between the first cylindrical end arc and the second cylindrical end arc; and wherein substantially all anhydrous ammonia fertilizer discharged from said chamber passes into the plurality of elongated orifices and through the tube bores through the plurality of graphite tubes that are active.

13. An anhydrous ammonia fertilizer metering and distribution apparatus, set forth in claim 12, wherein the anhydrous ammonia inlet in the body bottom wall is coaxial with the central bore through the body top wall.

14. An anhydrous ammonia fertilizer metering and distribution apparatus, set forth in claim 12, wherein the at least one spring urging the rotor toward the chamber flat bottom surface is a Belleville washer.

15. An anhydrous ammonia fertilizer metering and distribution apparatus, set forth in claim 12, wherein the at least one spring urging the rotor toward the bottom wall is at least two Belleville washer.

16. An anhydrous ammonia fertilizer application method comprising:

pressurizing an anhydrous ammonia fluid by vapor pressure of the anhydrous ammonia fluid to move the anhydrous ammonia fluid from a storage tank to an injector nozzle;

filing a chamber in a distribution and manifold with anhydrous ammonia;

rotatably supporting a rotor, with at least one elongated slot passing through the rotor from a rotor top surface to a rotor bottom surface, inside the chamber;

compressing a resilient O-ring and a graphite tube slidably received in a discharge counter bore, of a discharge bore, between a counter bore bottom surface and the rotor bottom surface to form an upper fluid seal between a first end of the graphite tube and the resilient O-ring and to form a lower fluid seal between the counter bore bottom surface and the resilient O-ring;

rotating the rotor and sliding the bottom surface of the rotor relative to a second end of the graphite tube to adjust the size of an opening into a tube bore through the graphite tube;

supplying fluid to the elongated slot from an upper area in the chamber adjacent to a rotor top surface;

supplying fluid to the elongated slot from a lower area in the chamber adjacent to a rotor bottom surface; and controlling the rate of fluid flow from the distribution and metering manifold by rotating the rotor relative to the tube bore through the graphite tube.

17. An anhydrous ammonia fertilizer application method, as set forth in claim 16, including forming a second elongated slot passing through the rotor top surface to the rotor bottom surface that cooperates with a second resilient O-ring and a second graphite tube in a second discharge bore to control the rate of fluid flow through the second elongated slot; and Wherein rotating the rotor for controlling the rate of fluid flow through the at least one elongated slot simultaneously adjusts the rate of fluid flow through the second elongated slot.

18. An anhydrous ammonia fertilizer application method, as set forth in claim 17, wherein rotating the rotor to control the rate of fluid flow maintains the rate of fluid flow through the at least one elongated slot substantially the same as the flow rate through the second elongated slot.

* * * * *